Jan. 12, 1960 H. L. HULL 2,920,959

METHOD OF FABRICATING A PHOSPHOR SCREEN

Filed Feb. 8, 1955 3 Sheets-Sheet 1

INVENTOR.
HARVARD L. HULL
BY
George A. Gust
ATTORNEY

METHOD OF FABRICATING A PHOSPHOR SCREEN

Filed Feb. 8, 1955 3 Sheets-Sheet 2

INVENTOR.
HARVARD L. HULL
BY
George R. Gust
ATTORNEY

INVENTOR.
HARVARD L. HULL
BY
George L. Gust
ATTORNEY

United States Patent Office 2,920,959
Patented Jan. 12, 1960

2,920,959

METHOD OF FABRICATING A PHOSPHOR SCREEN

Harvard L. Hull, Fort Wayne, Ind., assignor to International Telephone and Telegraph Corporation Application February 8, 1955, Serial No. 486,788

5 Claims. (Cl. 96—35)

The present invention relates to a method of fabricating a phosphor screen having particular utility in a color television picture tube.

In Farnsworth application Serial No. 430,648, filed May 18, 1954, and entitled "Color Television Apparatus," there is disclosed and claimed a particular design of color television picture tube wherein the principle of electron beam reflection is utilized for exciting a phosphor screen. In this Farnsworth tube, an apertured mask is positioned in the front end of the tube envelope in spaced relation with the face plate. The front side of the mask is provided with blue, green and red phosphor areas which are systematically arranged with respect to the mask apertures. On the face plate of the tube and in juxtaposition to the phosphor covered side of the mask is an electron-mirror surface composed of transparent conductive material which is suitably connected in to external circuitry for repelling or reflecting electrons. An electron gun positioned on the side of the mask opposite the mirror surface is so arranged as to direct a beam of electrons through the mask apertures toward the mirror surface. This mirror surface repels or reflects the electrons back onto the phosphor areas on the mask whereby the latter are excited to luminescence. By directing the aforementioned beam through the mask apertures at different predetermined angles, impingement of the beam upon the mask can be controlled to excite different colored phosphor areas. This affords a means of control whereby a colored image may be reproduced on the front surface of the mask and viewed through the tube face plate.

One of the problems encountered in fabricating this Farnsworth tube resides in the application and positioning of the different phosphor areas on the apertured mask. It is this problem with which the present invention is primarily concerned. Insofar as is necessary in order to obtain a clear understanding of this invention, the aforesaid Farnsworth application is made a part of this disclosure.

In following the method of this invention, a suitably apertured mask is positioned before a light-reflecting mirror in approximately the same relationship as the mask bears to the electron mirror of the finished tube. The front surface of the mask is provided with a layer of mixed photosensitive emulsion and phosphor material, and a light source positioned behind the mask at the same relative location as the electron gun in the finished tube is caused to direct a fine pencil-like beam of light through the mask apertures toward the mirror surface. The latter reflects this beam of light onto the phosphor layer at a point adjacent the aperture, such that the illuminated phosphor area will be exposed. The usual photographic techniques involved in developing the sensitized area are then employed, whereby the unexposed phosphor areas may be washed away leaving only the exposed areas intact or adhered to the mask surface.

In order to obtain a particular design of finished phosphor area, such as a straight-line strip of phosphor, the light beam is moved relative to the phosphor layer in a translatory or straight-line direction. Thus, the light beam is in effect swept over the phosphor layer in a straight-line or strip pattern. Development of the phosphor layer then leaves this straight-line pattern.

An object of this invention is to provide a method for fabricating a phosphor screen adapted for use with an electron mirror element.

Another object of this invention is to provide a method for fabricating an apertured phosphor screen wherein different colored phosphor areas are systematically positioned with respect to the screen apertures.

In accordance with the present invention, there is provided a method of fabricating a vari-colored phosphor screen comprising the steps of depositing a layer of a mixture of photosensitive emulsion and phosphor material on one side of an apertured mask, positioning a light-reflecting mirror surface a predetermined distance from the phosphor surface in substantial parallelism therewith, directing a beam of light emanating from a first given point through a mask aperture from the side of the mask opposite the mirror surface, said light beam being reflected from said mirror surface onto the phosphor layer at a point adjacent to said aperture for exposing the aforesaid emulsion, and developing the emulsion for removing the phosphor material lying outside the area of the exposed emulsion, the phosphor material which coincides with the exposed area remaining on the mask.

By varying the angle at which the light beam penetrates the aperture, corresponding areas of phosphor emulsion may be sensitized. Also, by producing relative movement between the light beam and the phosphor emulsion, different area designs of sensitized phosphor may be achieved.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
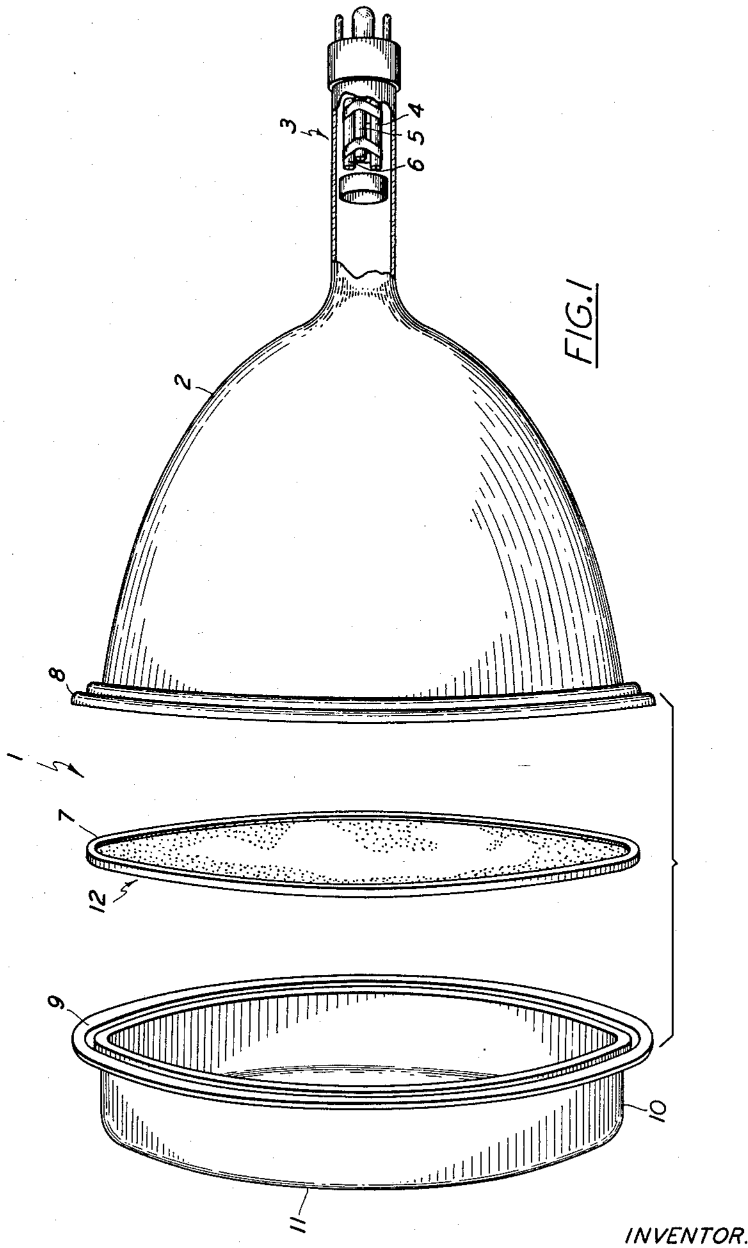
Fig. 1 is a perspective illustration of an exploded view of a picture tube incorporating the phosphor screen of this invention.

Referring to the drawings, and more particularly to Fig. 1, the illustrated picture tube, indicated generally by the reference numeral 1, is composed of the usual glass funnel 2 having an electron gun assembly 3 mounted in the neck thereof. This assembly 3 is of conventional design and is the same as is currently used in the CBS Colortron Picture Tube Type HD-187. This assembly is composed of three individual electron guns 4, 5 and 6, respectively, which are used in the reproduction of the three primary colors red, green and blue.

A perforated or apertured mask 7 of a size corresponding to the reproduced picture area is clamped in the front end of the finished tube between a flange 8 on the glass funnel 2 and the flange 9 on a glass hemisphere 10. At least the face plate 11 of this hemisphere 10 is transparent for the purpose of viewing the front surface 12 of the mask 7.

Figures 2, 3, 4:
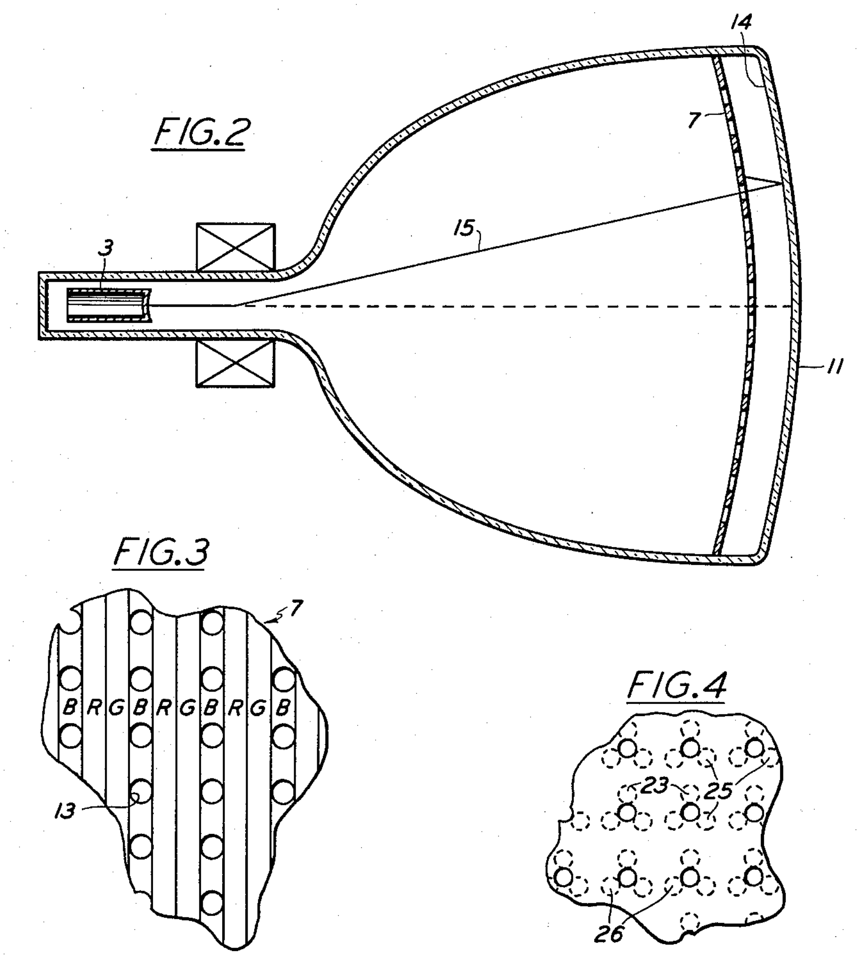
Fig. 2 is a diagrammatic illustration of the same picture tube which is used in explaining the operation thereof.
Fig. 3 is a fragmentary front elevation of the finished apertured mask.
Fig. 4 is a similar fragmental illustration showing a different phosphor pattern.

With reference to Fig. 3, strips of red, green and blue phosphor material are laid on the front surface 12 of the mask 7 in such a manner that the blue strips coincide with the mask apertures 13. Each blue strip is positioned between contiguous green and red strips as indicated.

Figure 5:
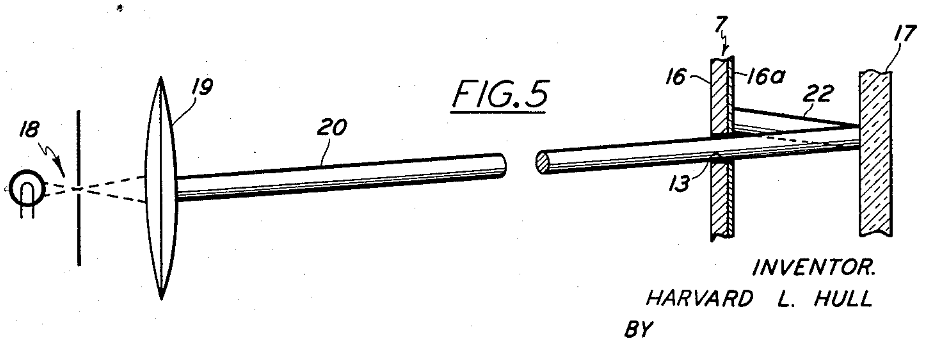
Fig. 5 is a diagrammatic illustration used in explaining this invention.

Referring to Figs. 2 and 5, the rear surface of the face plate 11 is provided with a conductive layer 14 of any suitable composition, which serves as an electron-reflecting or repelling element of the tube. This layer 14 is characterized hereinafter as the electron mirror.

An electron beam emanating from the electron gun 3 (Fig. 2) is suitably controlled and directed through an aperture 13 of the mask 7 such that it is reflected by the electron mirror 14 to impinge the mask at a point to one side and adjacent to the aperture. The phosphor material impacted by this reflected beam will thereby luminesce. By controlling the angle at which the electron beam 15 penetrates a given mask aperture 13, the point of beam impingement on the mask can be controlled to impinge a desired phosphor area adjacent the target aperture. Means for controlling the angle at which the beam 15 passes through the target aperture is fully explained in the aforementioned Farnsworth application.

In fabricating the screen 7, a suitably apertured supporting plate 16 made of either a conductive or insulating material is first coated on the front surface 16*a* with, for example, a blue phosphor material. This material constitutes a mixture of a suitable, conventional photosensitive emulsion and blue phosphor particles. An ordinary light-reflecting mirror 17 (Fig. 5) is positioned in front of the coated plate 16 in substantial parallelism therewith and essentially in the same position as the electron mirror 14 of the finished tube. In fact, ideally this mirror 17 is a replica of the electron mirror 14 as to both shape and position in the finished tube.

A suitable point source of light 18 is next positioned with respect to the plate 16 in the same location as the blue electron gun of the assembly 3 in the finished tube. A suitable optical device, such as lens 19, directs the light toward the apertured mask. Consider a thin pencil-like beam of light 20 through a selected aperture 13 toward the mirror 17; depending on the angle at which the beam 20 penetrates the aperture 13 a reflected beam 22 will fall on a corresponding area of the layer 16*a* of phosphor material. As shown in Fig. 5, the reflected beam 22 falls on an area immediately above the aperture 13.

This reflected beam of light exposes the illuminated area, whereupon development of the mixture of emulsion-phosphor serves to wash away the unexposed material, thereby leaving an area of phosphor corresponding to the exposed area.

If the beam 20 is circular in cross-section, and is held stationary, the developed phosphor area will also be circular. However, if the beam 20 is moved in such a manner as to change the angle at which it penetrates the aperture 13, the beam 22 will be caused to move correspondingly over the phosphor surface 16*a*. This movement of the light beam 20 may be effected by swinging the light source 18 and lens 19 in a suitable arc transverse to beam 20.

Figures 6, 7:
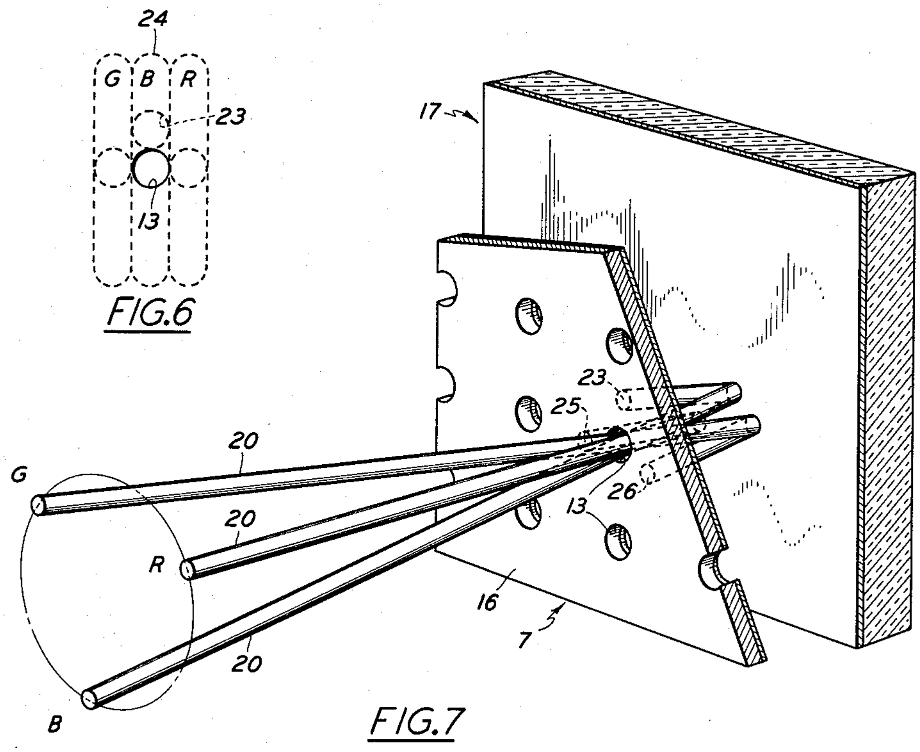
Fig. 6 is another illustration used in explaining the method of this invention.
Fig. 7 is a fragmentary perspective illustration showing the various angles at which either light beams or electron beams pass through the mask apertures.

The effect of this relative movement of the light beam 20 is graphically illustrated in Fig. 6 wherein the reference numeral 23 designates the position at which the reflected beam 22 of Fig. 5 impinges the phosphor layer. By swinging the optical device 18, 19 through a suitable arc, the beam 22 will be caused to move in a straight-line direction relative to the aperture 13, thereby producing a strip of exposed emulsion phosphor as indicated by the reference numeral 24.

In Fig. 4 is shown the developed phosphor areas 23 resulting from stationary exposure of the phosphor layer by means of the reflected beam 22.

Having now covered the preparation of a single area or a single series of areas of phosphor on the mask surface, the front surface of the plate 16 is covered with another mixture of emulsion-phosphor wherein the phosphor material is of another color, for example, green. The plate 16 and mirror 17 are positioned as before, and the light source 18 is positioned coincident with the position occupied in the finished tube by the "green" electron gun of the assembly 3. The light beam 20 emanating from this source in the new position will pass through the selected aperture 13 at an angle different from the first arrangement above described and will expose an area on a different side of the aperture 13. The plate 16 is now developed as before, thereby leaving the second exposed area or series of areas adhered to the plate 16.

The plate 16 is once more coated with another layer of emulsion phosphor, such phosphor being composed of particles that emit the color red when excited. The light source 18 is then positioned with respect to the plate 16 and mirror 17 coincidentally with the position normally occupied by the "red" electron gun of the assembly 3 in the finished tube. This places the light beam 20 at still a different angle with respect to the plate 16, whereupon a red area will be exposed on the phosphor surface. The plate 16 is again developed as before, leaving the third area or series of areas of phosphor.

For each of the three exposures, the light source may be oscillated to produce strip areas as illustrated in Fig. 6.

The relationship of the different light beams 20 just described are graphically illustrated in Fig. 7, showing that reflection from the mirror 17 serves to illuminate the front surface of the plate 16 at different points as indicated by the reference numerals 23, 25 and 26 respectively.

In the finished tube, the three paths indicated by the reference numeral 20 of Fig. 7 are occupied by the respective electron beams emanating from the three guns 4, 5 and 6 of the assembly 3. Thus, since the electron beam follows the same path as the original light beam, registration between the individual electron beams and the phosphor areas on the mask is assured and is automatically achieved.

While the straight-line strips of Fig. 6 have been explained as being formed by suitable reciprocation of the light source 18, it will appear as obvious that this light source and the plate 16 may be held stationary and the mirror 17 may be suitably oscillated to reflect the light beam over the desired straight-line path. Another arrangement for exposing the coated surface of the plate 16 is to hold the light source 18 and mirror 17 stationary and rock the plate 16 about an appropriate axis in order to change the position of impingement of the reflected beam 22 on the phosphor coating. In the final analysis, the only requirement in exposing the selected area of the phosphor coating is to provide relative movement between the coated plate 16 and the reflected beam 22 whereby the latter is effectively moved to different exposing positions on the phosphor coating.

In following this procedure, it is not only possible to form the strips required by the design of Fig. 3, but also the phosphor triad dot arrangement of Fig. 4. In Fig. 4, each triad may have the color arrangement of the dot 23 being blue, the dot 25 being red, and the dot 26 being green. From this it will be seen that any desired pattern or arrangement of discrete phosphor areas on the apertured mask may be achieved by suitably controlling the relative movement between the reflected beam 22 and the coated plate 16. This invention is, therefore, fundamental in concept in the formation of discrete, different colored phosphor areas on an apertured mask. Of importance is the fact that this method of fabrication permits exact registration between the color areas on the mask and the electron beams whereby color purity in operation of the picture tube is assured.

While the specific example explained hereinabove utilizes a single ray or beam 20 for producing a single spot of phosphor, in actual practice the lens 19 preferably produces a collimated beam of light of relatively large cross-sectional area which covers substantially the entire plate 16. This collimated beam of light may then be reciprocated as above described for producing a multiplicity of phosphor areas in proper relationship to the corresponding apertures. Instead of using collimated rays, it is necessary in some instances to utilize slightly converging or diverging rays in order to make the finished phosphor spots or strips either smaller or larger than the apertures 13 as may be desired.

It may be stated that the above-described photographing technique used in forming the different colored phosphor areas is conventional and is currently being used in fabricating the screen of the CBS Colortron Type HD-187 picture tube. This technique is explained in the publication entitled "The CBS-Colortron, transcript of speech given at the 'CBS Hytron' Technical Press Conference on October 5, 1953."

Figure 8:
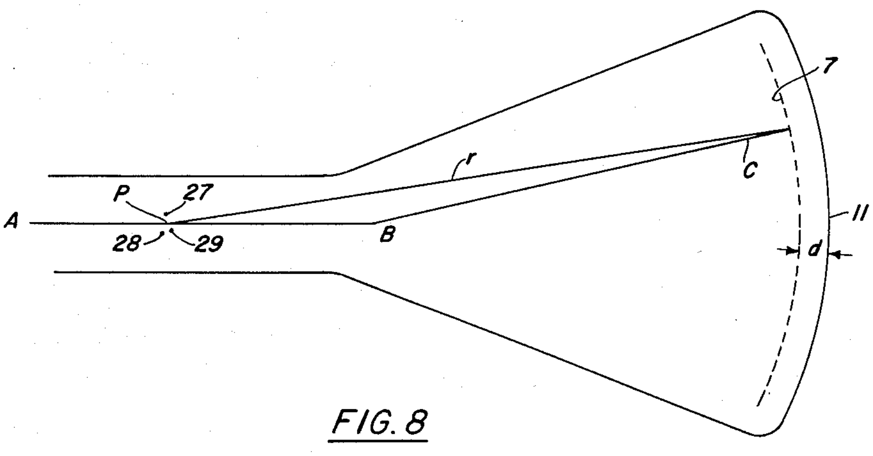
Fig. 8 is a diagrammatic illustration of another embodiment of this invention.

Instead of using a lens 19 for directing light over the mask 7, it is possible to use a single source of light without a lens as is illustrated by Fig. 8. In this figure, the ray ABC indicates the path followed by an electron beam which, in the absence of a color signal, would impinge the shadow mask 7 perpendicularly. A tangent to this path ABC at point C projected backwardly intersects the axial path AB at point P which is the center of curvature of the mask 7. A plane transverse to the path AB and including the point P may be considered as coinciding with the center of curvature of the mask 7. Three light sources 27, 28 and 29 are positioned in this plane a short distance "*u*" from the line AB as is more fully explained in the following. If it is desired to obtain light spots on the color mask 7 at a distance "*v*" from each mask aperture, it can be shown that $$\frac{u}{r}=\frac{v}{4d}$$

"*r*" is the distance on the tangent from point P to point C, and "*d*" is the dimension between the mask 7 and face plate 11. Thus assigning the quantities "*d*" equals .25 inch, "*r*" equals .25 inch, and "*u*" equals .25 inch, the distance "*v*" on the color mask is equal to 10 mils. From this can be seen that a variation in any one of the known quantities "*u*," "*r*" and "*d*" will serve to vary the dimension "*v*."

By following the exposure steps as outlined in the preceding, the phosphor areas on the mask 7 are formed sequentially by exposures resulting from light sources coinciding with the points 27, 28 and 29, respectively. Since these points lie in a plane substantially coincident with the center of curvature of the mask 7, no lens is needed, such as the lens 19. By making exposures from the respective positions 27, 28 and 29 a phosphor pattern resembling that of Fig. 4 may be produced.

If it is desired to expose strips as illustrated in Fig. 3, a suitable mask containing a small slot is sequentially positioned in registry with the respective points 27, 28 and 29, respectively, and a source of light is positioned behind the mask to direct light through the slot and onto the mask 7.

While I have described above the principles of my invention in connection with specific apparatus, it is to be clearly understood that this description is made only by way of example and not as a limitation to the scope of my invention.

What is claimed is:

1. The steps in the method of fabricating a phosphor screen composed of an apertured mask comprising depositng a layer of a mixture of photosensitive emulsion and phosphor on one side of said mask, positioning a mirror surface a predetermined distance from the phosphor surface in substantial parallelism therewith, directing a beam of light emanating from a first given point through a mask aperture from the side of the mask opposite said mirror surface, said light beam being reflected from said mirror surface onto the phosphor layer at a point adjacent to said aperture for exposing said emulsion, and developing said emulsion for removing the phosphor lying outside the area of exposed emulsion, the phosphor coinciding with the exposed area remaining on said mask.

2. The method of claim 1 and including the step of directing a second beam of light emanating from a second given point through the same aperture for reflection by said mirror surface onto said phosphor layer, said first and second given points being spaced apart whereby two different areas of phosphor adjacent said aperture will be exposed.

3. The method of claim 1 and including the steps of depositing a second layer of phosphor and emulsion mixture on said one mask side, directing a second beam of light emanating from a second given point through the same aperture for reflection by said mirror surface onto said phosphor layer, said first and second given points being spaced apart whereby two different areas of phosphor adjacent said aperture will be exposed, and developing the exposed second layer for providing a second phosphor area spaced from the first phosphor area.

4. The method of claim 1 and including the step of relatively moving the reflected beam of light with respect to said phosphor layer whereby an area of phosphor larger than the cross-sectioned area of said beam will be exposed.

5. The method of claim 1 and including the step of relatively moving the reflected beam of light with respect to said phosphor layer whereby an area of phosphor larger than the cross-sectional area of said beam will be exposed, said relative movement being translational whereby a straight-lines strip of phosphor will be exposed.

References Cited in the file of this patent

UNITED STATES PATENTS

| | | |
|---|---|---|
| 2,683,769 | Banning | July 13, 1954 |
| 2,685,660 | Norgaard | Aug. 3, 1954 |
| 2,728,025 | Weimer | Dec. 20, 1955 |
| 2,733,366 | Grimm et al. | Jan. 31, 1956 |
| 2,777,088 | Lafferty | Jan. 8, 1957 |

OTHER REFERENCES

Levy et al.: "The Preparation of Phosphor Screens for Color Television Tubes," Sylvania Technologist—July 1953, pp. 60–63. (Copy available Division 67.)